United States Patent [19]

Asari et al.

[11] Patent Number: 5,644,329
[45] Date of Patent: Jul. 1, 1997

[54] DISPLAY APPARATUS AND A DATA SIGNAL FORMING METHOD FOR THE DISPLAY APPARATUS

[75] Inventors: Goro Asari, Yokohama, Japan; Temkar N. Ruckmongathan, Bangalore, India; Takeshi Kuwata, Yokohama; Yutaka Nakagawa, Isehara, both of Japan

[73] Assignee: Asahi Glass Company Ltd., Tokyo, Japan

[21] Appl. No.: 556,633

[22] Filed: Nov. 13, 1995

Related U.S. Application Data

[63] Continuation of Ser. No. 197,883, Feb. 17, 1994, abandoned.

[30] Foreign Application Priority Data

Feb. 19, 1993 [JP] Japan .................................. 5-055146

[51] Int. Cl.$^6$ .................................................. G09G 3/36
[52] U.S. Cl. ............................... 345/89; 345/100; 345/98
[58] Field of Search ............................ 345/89, 100, 98, 345/87, 94, 95, 96, 97, 99, 103, 208, 209, 210, 147, 148

[56] References Cited

U.S. PATENT DOCUMENTS

4,910,683  3/1990  Bishop .................................. 345/201

FOREIGN PATENT DOCUMENTS

0 254 805  2/1988  European Pat. Off. .
0 441 591  8/1991  European Pat. Off. .
0569974   11/1993  European Pat. Off. .

OTHER PUBLICATIONS

"Some New Addressing Techniques for RMS Responding Matrix LCD's" by T.N. Ruckmongathan. Thesis Submitted for the Degree of Doctor of Philosophy, Dept. of Electrical Communication Engineering Indian Institute of Science, Feb. 1988.

"New Addressing Techniques for Multiplexed Liquid Crystal Displays", by T.N. Ruckmongathan and N.V. Madhusudana, Proceedings of the SID, V. 24/3, 1983.

1988 Int'l Display Research Conference, "A Generalized Addressing Technique for RMS Responding Matrix LCDS", by T.N. Ruckmongathan, pp. 80–85.

(List continued on next page.)

*Primary Examiner*—Xiao Wu
*Attorney, Agent, or Firm*—Oblon, Spivak, McClelland, Maier & Neustadt, P.C.

[57] ABSTRACT

A display apparatus wherein the light transmittance of a pixel selected by a scanning electrode and a data electrode is changed in response to the difference of voltages applied to the scanning electrode and the data electrode, which comprises a display panel having a plurality of scanning electrodes and a plurality of data electrodes, a scanning voltage generator for applying a scanning voltage to the scanning electrodes of the display panel by receiving a scanning signal, a data voltage generator for applying a data voltage to the data electrodes of the display panel by receiving a data signal, an orthogonal function generator for generating an orthogonal function signal having substantially orthogonality, and a data signal forming circuit for operating the data signal based on a predetermined video signal and the orthogonal function signal generated from the orthogonal function generator, wherein the data signal forming circuit includes a field video signal converter for distributing signals for a single picture to those for a plurality of sub-pictures, and an orthogonal conversion signal generator for effecting orthogonal conversion of an input signal by the orthogonal function signal generated from the orthogonal function generator, the field video signal converter and the orthogonal conversion signal generator being connected in series, and a correction signal generator for generating a correction signal to be included in the data signal so that an effective voltage applied to a pixel in a non-selection time is substantially constant to any pixel.

8 Claims, 10 Drawing Sheets

OTHER PUBLICATIONS

Proceedings of the Twelfth Intern. Display Research Conference, Oct. 1992, T.N. Ruckmongathan, et al., pp. 65–68, "A New Addressing Technique for Fast Responding STN LCDs".

A. Kmetz, J. Nehring. "Ultimate Limits for RMS Matrix Addressing" Symp. Phys & Chem Liquid Crystal Dev. 7–8 Feb., 1979. Plenum 1980.

DISPLAY APPARATUS AND A DATA SIGNAL FORMING METHOD FOR THE DISPLAY APPARATUS

This application is a Continuation of application Ser. No. 08/197,883, filed on Feb. 17, 1994, now abandoned.

BACKGROUND OF THE INVENTION

1. Field of the Invention

The present invention relates mainly to a display apparatus having a matrix arrangement. Particularly, the present invention relates to a passive matrix display apparatus of a type that light transmittance is rapidly changed when a voltage applied to the intersection of a lateral electrode and a longitudinal electrode, i.e. a row electrode and a column electrode of a matrix exceeds a threshold value.

2. Discussion of the Background

A conventional technique will be described with reference to a liquid crystal display apparatus wherein a signal electrode and a scanning electrode are respectively referred to as a column electrode and a row electrode. In a passive matrix type liquid crystal display apparatus comprising an $N_r$ number of row electrodes and an $M_c$ number of column electrodes, a so-called successive line scanning method has been used to drive it. Namely, a group of pixel signals corresponding to pixels on an arbitrary line of row electrodes is applied to column electrodes, and at the same time, a column electrode selective voltage is applied to each row electrode. Thus, the light transmittance of each pixel selected by the application of the row electrode selective voltage is changed. The above-mentioned operation is effected to scan the $N_r$ number of row electrodes for each row electrode.

In the liquid crystal display apparatus, the light transmittance of a pixel has a threshold characteristic which relies on the effective value of a voltage applied to the pixel. In the above-mentioned driving method, it has been known that the condition to obtain the ratio of the maximum and minimum values of light transmittance, i.e. the largest contrast ratio can be expressed by formula (1) (reference document: Scanning Limitations of Liquid-Crystal-Displays, IEEE Transactions on Electron Devices, vol. ED-21, No. 2, February 1974, pp146–155 by Paul M. Alt, Peter Pleshko):

$$V_r/V_c = N_r^{1/2} \quad (1)$$

Under the condition of the formula (1), the ratio of the effective value $V_{on}$ of a pixel voltage which provides the maximum (or the minimum) light transmittance to the effective value $V_{off}$ of the pixel voltage which provides the minimum (or the maximum) transmittance is expressed by formula (2).

$$V_{on}/V_{off} = ((N_r^{1/2}-1)/(N_r^{1/2}+1))^{1/2} \quad (2)$$

Further, $V_{off}$ is given by formula (3).

$$V_{off} = V_c(2(N_r - N_r^{1/2})/N_r^2)^{1/2} \quad (3)$$

From the formulas (1) and (3), formula (4) is obtained.

$$V_r = V_{off}[N_r/(2(1 - 1/N_r^{1/2}))^{1/2}]^{1/2} \quad (4)$$
$$= V_{th}[N_r/(2(1 - 1/N_r^{1/2}))^{1/2}]^{1/2}$$

The value $V_{off}$ is generally set to a threshold value $V_{th}$ of transmittance vs effective value characteristics. Accordingly, the values $V_c$ and $V_r$ are determined by the value of $V_{th}$. Therefore, the conventional technique had a drawback that as the number of row electrodes was increased, a very higher value was required for the row voltage. In the passive matrix display apparatus, a gray shade display could be obtained by an amplitude modulation wherein a column voltage is changed depending on a degree of gray shade, or by changing a voltage application time in a case that a voltage applied to row electrodes is fixed to $+V_r$ or $-V_r$ in a selection time, and the voltage is 0, in a non-selection time. As a method for changing the application time, there are a method of changing the pulse width of a column voltage (pulse width modulation) and a method of changing the number of pulses while the pulse width is constant (pulse number modulation). To effect the pulse number modulation, for instance, one picture may be expressed by the number of frames (or the number of fields) corresponding to the number of gray shade levels, and column electrode pulses are applied to obtain $V_{on}$ depending on the gray shade of each of the pixels. Such method is called frame modulation.

The amplitude modulation, when it is done without any correction, results in non-uniformity of display because the effective value or the root mean square value of a voltage applied to a pixel in a non-selection time is variable depending on pixels. Further, the pulse width modulation may cause non-uniformity of display because a driving waveform distortion becomes large for a pixel remote from a driving point due to an electrode resistance when a signal having a narrow pulse width is applied. When the pulse width is sufficiently widened in the pulse width modulation, the frame frequency becomes too small so that a flicker of picture is resulted. Further, the frame modulation has a problem that a low frequency driving signal component increases and a flicker becomes conspicuous as the number of gray shade levels increase, unless the frame frequency is increased.

SUMMARY OF THE INVENTION

It is an object of the present invention to provide a display apparatus for providing a gray shade display and minimizing non-uniformity of display and a flicker.

In accordance with the present invention, there is provided a display apparatus wherein the light transmittance of a pixel selected by a scanning electrode and a data electrode is changed in response to the difference of voltages applied to the scanning electrode and the data electrode, the display apparatus being characterized by comprising:

a display panel having a plurality of scanning electrodes and a plurality of data electrodes, a scanning voltage generator for applying a scanning voltage to the scanning electrodes of the display panel by receiving a scanning signal, a data voltage generator for applying a data voltage to the data electrodes of the display panel by receiving a data signal, an orthogonal function generator for generating an orthogonal function signal having substantial orthogonality, and a data signal forming circuit for operating the data signal based on a predetermined video signal and the orthogonal function signal generated from the orthogonal function generator, wherein the data signal forming circuit includes a field video signal converter for distributing signals for a single picture to those for a plurality of sub-pictures, and an orthogonal conversion signal generator for effecting orthogonal conversion of an input signal by the orthogonal function signal generated from the orthogonal function generator, the field video signal converter and the orthogonal conversion signal generator being connected in series, and a correction signal generator for generating a correction signal to be included in the data signal so that an effective voltage applied to a pixel in a non-selection time is substantially constant to any pixel.

In the above-mentioned invention, an output from the correction signal generator is superposed on outputs from the field video signal converter or the orthogonal functional generator.

In the above-mentioned invention, an output from the correction signal generator is superposed on inputs to the field video signal converter or the orthogonal function generator.

Further, the data signal forming circuit includes a field counter for supplying a picture number to the field video signal converter.

Further, in accordance with the present invention, there is provided a data signal forming method for driving a display apparatus by applying a selection voltage simultaneously to a plurality of scanning electrodes, the display apparatus being provided with a plurality of scanning electrodes and a plurality of data electrodes wherein the light transmittance of a pixel selected by a scanning electrode and a data electrode is changed in response to the difference of voltages applied to the scanning electrode and the data electrode, the data signal forming method being characterized in that data signals include:

(1) a first signal formed by distributing video signals for a single picture to those for a plurality of sub-pictures and by conducting orthogonal conversion, and (2) a second signal for correcting the first signal so that an effective voltage applied to a pixel in a non-selection time is substantially constant to any pixel.

The above-mentioned invention, the data signal is formed by superposing the first and second signals in a separate time period.

Further, the data signal including the first and second signals in simultaneous superposition is formed by operating the second signal for each group as the scanning electrode are simultaneously selected, and a signal obtained by the operation is superposed on the video signal, followed by orthogonal conversion.

In drawings:

DESCRIPTION OF THE PREFERRED EMBODIMENT

Preferred embodiments of the present invention will be described with reference to the drawings.

As described above, the conventional display apparatus had such disadvantage that when the number of row electrodes was increased, the peak value of a driving voltage became large in order to obtain a predetermined level of the effective value of the driving voltage. On the other hand, according to the present invention, the driving voltage can be reduced by combining the conversion of a video signal by using an orthogonal function and the inverse conversion of the video signal in addition to simultaneously selecting a plurality of row electrodes.

A method of reducing the driving voltage will be described with reference to FIG. 2.

Figure 2:
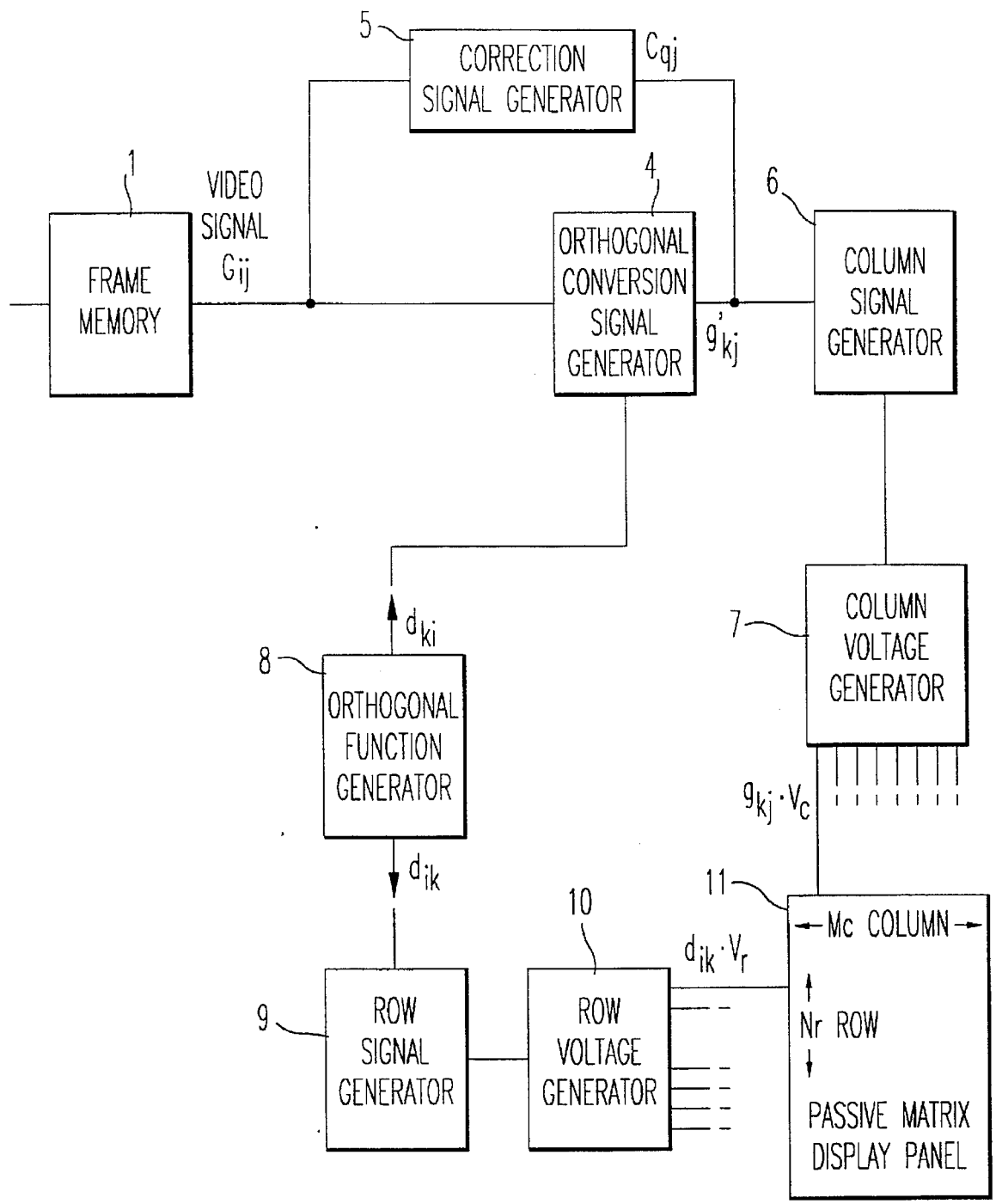
FIG. 2 is a block diagram showing the construction of a conventional display apparatus.

FIG. 2 shows a treatment of signals after video signals have been converted into digital signals. The video signals are once stored in a frame memory 1, and then, are subjected to signal conversion, preferably, by a regular orthogonal function system, on signals of an L number of horizontal lines which correspond to arbitrarily selected an L number of row electrodes (row number=i, i=1–L) in a display panel 11. By the signal conversion, orthogonal conversion signals $g'_{kj}$ are obtainable. A symbol "'" means a column electrode element to which a correction signal described later is not added. Namely, when the video signal (gray shade signal) of a pixel (i, j) corresponding to a row number i (i=1–L) and a column number j (j=1–$M_c$) is $G_{ij}$, and a signal from an orthogonal function generator is expressed by a matrix [$d_{ki}$], an orthogonal conversion signal can be expressed by formula (5):

$$g'_{kj}(\Delta t_k) = \Sigma d_{ki} G'_{ij} \{k=1-L, i=1-L\} \quad (5)$$

where k is a suffix relating to time and it assumes a value from 1 through L.

A relation of ($\Delta t_k$) to a time $\Delta t_s$ in which a group of row electrodes [i (i=1–L)] is selected is expressed by formula (6):

$$\sum_{k=1}^{L} \{\Delta t_k\} = \Delta t_s \quad (6)$$

where i indicates the number of the row electrodes described above. An L number of pixels on a j column which are considered to be a single group are developed as an L number of signals on the time axis. Hereinbelow, $g'_{kj}$ indicates $g'_{kj}(\Delta t_k)$ unless specifically mentioned. When a Walsh function system is used to obtain an orthogonal function, for instance, [$d_{ki}$] takes function values shown in Table 1.

TABLE 1

Orthogonal function [$d_{ki}$] {k = 1–L, i = 1–L}
An example of a Walsh function A case of L = 2

|   |   | i |    |
|---|---|---|----|
|   |   | 1 | 2  |
| k | 1 | +1 | +1 |
|   | 2 | +1 | −1 |

A case of L = 4

|   |   | i |    |    |    |
|---|---|---|----|----|----|
|   |   | 1 | 2  | 3  | 4  |
| k | 1 | +1 | +1 | +1 | +1 |
|   | 2 | +1 | −1 | +1 | +1 |
|   | 3 | +1 | +1 | −1 | −1 |
|   | 4 | +1 | −1 | −1 | +1 |

A case of L = 8

|   |   | i |    |    |    |    |    |    |    |
|---|---|---|----|----|----|----|----|----|----|
|   |   | 1 | 2  | 3  | 4  | 5  | 6  | 7  | 8  |
| k | 1 | +1 | +1 | +1 | +1 | +1 | +1 | +1 | +1 |
|   | 2 | +1 | −1 | +1 | +1 | +1 | −1 | +1 | +1 |
|   | 3 | +1 | +1 | −1 | −1 | +1 | +1 | −1 | −1 |
|   | 4 | +1 | −1 | −1 | +1 | +1 | −1 | −1 | +1 |
|   | 5 | +1 | +1 | +1 | +1 | −1 | −1 | −1 | −1 |
|   | 6 | +1 | −1 | +1 | +1 | −1 | +1 | −1 | −1 |
|   | 7 | +1 | +1 | −1 | −1 | −1 | −1 | +1 | +1 |
|   | 8 | +1 | −1 | −1 | +1 | −1 | +1 | +1 | −1 |

Hereinbelow, description will be made on the supposition that a degree L of orthogonal function is equal to the number of simultaneously selected row electrodes. When the degree L of the orthogonal function is not equal to the number of simultaneously selected row electrodes, the following description can be applied by adding an imaginary electrode (electrodes) to the row electrodes simultaneously selected.

A group of the video signals $G_{ij}$ (i=1–L) having a column number of j and a row number of i is converted into an L number of orthogonal conversion signals $g'_{kj}$ (k=1–L) relating to j column electrodes, and the converted orthogonal conversion signals are developed on the time axis.

When a display of signals corresponding to the original video signals is required on the display panel 11, the orthogonal conversion signals $g'_{kj}$ can be converted inversely. The inverse conversion is expressed by formula (7):

$$[G_{ij}] = [d_{ki}]^{-1}[g'_{kj}] \tag{7}$$

Because [$d_{kj}$] is an orthogonal function, [$d_{ki}$]=[$d_{ik}$], formula (8) is obtainable.

$$[G_{ij}] = (1/L)[d_{ik}][g'_{kj}] \tag{8}$$
$$= (1/L)\sum_{k=1}^{L}\{d_{ik}g'_{kj}\}$$

In order to realize the inverse conversion, the orthogonal function [$d_{ik}$] can be used as a driving signal for the row electrodes i (i=1–L) simultaneously selected. In this case, the light transmittance of liquid crystal depends on the effective value of an applied voltage, i.e. the root mean square value, and accordingly, the display signals contain the sum of products $$\sum_{k=1}^{L}\{d_{ik}g'_{kj}\}$$

of the row signals ($d_{ik}$) and the column signals ($g'_{kj}$), whereby restored signals corresponding to the original video signals can be obtained. The process will be described in more detail.

When the effective value of a voltage applied to a pixel (i, j) in a frame is $V_{ij}$, formulas (9) and (10) are respectively obtainable:

$$V_{ij}^2 = \left[\sum_{k=1}^{L}\{(d_{ik}V_r - g'_{kj}V_c)^2\} + \sum_{k=L+1}^{F}\{(g'_{kj}V_c)^2\}\right]/F \tag{9}$$

$$F = L \cdot M \quad F \geq N_r \tag{10}$$

In formula (10), M indicates a number of times for simultaneous selection required for scanning entirely the number $N_r$ of row electrodes in a case the L number of row electrodes are simultaneously selected at once. Namely, M indicates a number of times for simultaneous selection necessary for completing a frame. Accordingly, F is an integer greater than or equal to $N_r$.

Row electrode driving signals $d_{ik}$ are generated from an orthogonal function generator 8 and the signals are supplied to a row signal generator 9 whereby voltages ($d_{ik}V_r$) are generated from a row voltage generator 10 to be applied to row electrodes i. Orthogonal conversion signals $g'_{kj}$ are generated from a column signal generator 6 to be supplied to a column voltage generator 7 from which voltages ($g'_{kj}V_c$) are generated to be applied to column electrodes j.

The first term in formula (9) shows a time period in which the row electrodes are selected, and the second term corresponds to the square average value of a non-selection time period. The row voltage in a non-selection time is 0, and the length of the time is expressed by formula (11):

$$L \cdot (M-1) \cdot (\Delta t_k) \tag{11}$$

By developing and arranging formula (9), formula (12) is obtainable:

$$V_{ij}^2 = \left[\sum_{k=1}^{L}\{(d_{ik}V_r)^2\} + \sum_{u=1}^{L}\{(g'_{uj}V_c)^2\} - 2\sum_{k=1}^{L}\{(d_{ik}g'_{kj})V_rV_c\}\right]/F \tag{12}$$

since $d_{ik}=\pm 1$, the first term in formula (12) can be arranged as shown in Formula (13) wherein the first term is constant.

$$\sum_{k=1}^{L}\{(d_{ik}V_r)^2\} = LV_r^2 \tag{13}$$

From equation (8), it is clear that the third term in equation (12) is the inverse conversion of $g'_{kj}$. By substituting formula (8) for the third term of formula (12), formula (14) is obtainable. Accordingly, the third term of formula (12) is constant.

$$2\sum_{k=1}^{L}\{(d_{ik}g'_{kj})V_rV_c\} = 2LG_{ij}V_rV_c \tag{14}$$

Accordingly, when the second term of formula (12) is kept constant, $V_{ij}$ and the video signal $G_{ij}$ have a one-to-one relation whereby the picture image can be restored. In this case, the effective voltage of pixels in a non-selection time is constant, and non-uniformity of display for the pixels in an OFF state can be minimized.

Now, conditions to keep the second term of formula constant (12) are examined.

When a binary data is used, the value $V_c$ is constant, and accordingly, the second term of formula (12) is constant. However, when the amplitude modulation is effected, the second term is not always constant. Now, conditions to provide the second term of formula (12) being constant even when the amplitude modulation is effected, will be described.

The second term of formula (12) is originally expressed by:

$$\sum_{u=1}^{F}\{(g_{uj}V_c)^2\} = \left[\sum_{l=L+1}^{F}\{(g'_{lj})^2\} + \sum_{k=1}^{L}\{(g'_{kj})^2\right]V_c^2$$

When a term $\Sigma(c'_{qj})^2$ relating to a correction signal is added to $\Sigma(g'_{kj})^2$, a formula $\Sigma(g_{kj})^2 = [\Sigma(g'_{kj})^2 + \Sigma(c'_{qj})^2]$ is obtainable, which should be constant. In the formula, an accompanying character q indicates a simultaneous selection number wherein q=1–M; M=F/L. The conditions can be expressed as shown in formula (15):

$$\sum_{k=1}^{L}\{(d_{kj}V_c)^2\} = \sum_{k=1}^{L}\{[(g'_{kj})^2 + (c'_{qj})^2]V_c^2\} = PV_c^2 \quad (15)$$

where P is a constant. If formula (15) can be established for all groups simultaneously selected, the second term of formula (12) can be expressed as follows:

$$\sum_{u=1}^{F}\{(g_{uj}V_c)^2\} = \sum_{\text{subgroup}}^{M}\left\{\sum_{k=1}^{L}\{(g_{kj}V_c)^2V_c^2\}\right\} = MPV_c^2 \quad (16)$$

where "subgroup" indicates the simultaneously selected groups. When formula (12) is rewritten by using formulas (14), (15) and (16), formula (17) is obtainable:

$$V_{ij}^2 = [LV_r^2 + MPV_c^2 - 2LG_{ij}V_rV_c]/F \quad (17)$$

In effecting the amplitude modulation, there is no guarantee that the second term of formula (12) is constant, but the second term changes depending on the video signals. Accordingly, non-uniformity of display is resulted if the conversion signal is not corrected in formula (12). In the present invention, correction signals $C_{qj}$ are inputted from signal generator 5 to the column signal generator 6 shown in FIG. 1 while the video signals are monitored so that the second term of formula (17) is equal to a predetermined value. Thus, formulas (15) and (16) become satisfied. Before describing a method of generating the correction signal, formula (17) will be described. The maximum value and the minimum value of formula (17) are obtained on the assumption that the second term of the formula (17) is always kept constant by the correction signal in a frame, and the maximum and minimum values are compared with those of formulas (1) through (3) for the conventional technique.

Since the first and second terms of formula (17) are constants, the maximum and minimum values are determined by the third term. As to $G_{ij}$, the following relation is established from the conditions of formula (15).

$$|G_{ij}| \leq P^{1/2}/L \quad (18)$$

Formulas (15) and (18) express scale factors between the video signals and column signals. Accordingly, the maximum value and the minimum value of formula (17) can be expressed by formula (19).

$$(V_{ij}^2)_{MIN}, \text{ or, } (V_{ij}^2)_{MAX} = [LV_r^2 + MPV_c^2 \pm 2L(P^{1/2}/L)V_rV_c]/F \quad (19)$$

The ratio of the maximum value to the minimum value (or the selection ratio) of formula (19) is obtained. The selection ratio has the same meaning as the ON/OFF ratio described with reference to formula (2). When the selection ratio is expressed by (SR), formula (20) is given as follows:

$$(SR)^2 = [LV_r^2 + MPV_c^2 + 2L(P^{1/2}/L)|V_rV_c|]/ \quad (20)$$

$$[LV_r^2 + MPV_c^2 - 2L(P^{1/2}/L)|V_rV_c|]$$

Maximum value of formula (20) is provided when the term $(LV_r^2 + MPV_c^2)$ assumes the minimum value, namely, it is the case that formula (21) is established.

$$LV_r^2 = MPV_c^2 \quad (21)$$

By putting formula (21) in formula (20) and arranging it, formula (22) is obtainable.

$$(SR)^2_{MAX} = ((LM)^{1/2}+1)/((LM)^{1/2}-1) \quad (22)$$

Under the condition of formula (21), the minimum value of the pixel voltage is expressed by formula (23) by using formula (19).

$$(V_{ij}^2)_{MIN} = [LV_r^2 + MPV_c^2 - 2L(P^{1/2}/L)|V_rV_c|]/F \quad (23)$$

$$= 2L[1 - 1/F^{1/2}]V_r^2/F$$

When the minimum value is set the threshold voltage $V_{th}$, formula (24) is obtainable.

$$V_r = V_{th}[F/(2L(1-1/F^{1/2}))]^{1/2} \quad (24)$$

In comparing formula (24) with formula (4), when there are many row electrodes, $N_r^{1/2} \gg 1$ or $F^{1/2} \gg 1$. Accordingly, the peak value of the row voltage shown in formula (24) is reduced by a factor of $F/(N_rL^{1/2})$.

After the value $V_r$ has been determined, a column driving peak voltage $V_c$ varies depending on the ratio of L to M. Since L<M in general, the column driving peak voltage $V_c$ is lower than a row driving peak voltage $V_r$. Further, F=LM, which is a figure close to $N_r$. Accordingly, the ON/OFF ratio, i.e. the selection ratio (formula (22)) assumes substantially the same value as that of formula (2) showing ON/OFF ratio in the conventional technique.

Description has been made as to a case that the number of row electrodes simultaneously selected (hereinbelow referred to S) and the degree number L of the orthogonal function has a relation of S=L. However, in a case of S≠L, it is necessary to select the orthogonal function so as to be L>S. In this case, the number of times M of simultaneous selection is a minimum integer of $M \cdot S > N_r$, and a time per frame is $F = L \cdot M \cdot \Delta t_k$ which is longer than a case that S is equal to L, and the selection ratio is also small.

As described above, the driving voltage can be reduced by the simultaneous selection of a plurality of the row electrodes and the conversion of signals by orthogonal function.

In the following, a method of generating a correction signal to suppress occurrence of non-uniformity of display will be described.

Correction signals may be produced so as to satisfy the formulas (16) and (15).

Formula (16) will be examined first. Since formula (16) shows the sum of all row numbers, a video image can be restored if formula (16) is constant, although there is no guarantee that formula (15) is constant. Further, when pixels are on the same row electrodes, the second term of formula (15) takes the same value regardless of the row number. Accordingly, the correction signal may be applied so as to satisfy formula (16) as long as the quality of display is not deteriorated, and it may not be generated for each time of simultaneous selection.

As sufficient conditions, conditions for rendering formula (15) to be constant, is considered. The following equation is obtainable by rewriting formula (15).

$$\sum_{k=1}^{L} \{(g_{kj})^2\} = \sum_{k=1}^{L} \{(g'_{kj})^2 + (c'_{qj})^2\} = P \tag{25}$$

In order to obtain $C'_{qj}$ for satisfying formula (25), formula (26) is examined, which is the net squared and summed value of signals obtained by orthogonal conversion of the video signals $G_{ij}$.

$$\sum_{k} \{(g'_{kj})^2\} = \sum_{k} \left\{ \left( \sum_{i} \{d_{ki} G_{ij}\} \right)^2 \right\} \tag{26}$$

Formula (26) can be reformed into formula (27) by using the matrix $[d_{ki}]$ as orthogonal function.

$$\sum_{k} \{(g'_{kj})^2\} = \sum_{k} \left\{ \left( \sum_{i} \{d_{ki} G_{ij}\} \right)^2 \right\} \tag{27}$$

$$= L \sum_{i=1}^{L} \{G_{ij}^2\}$$

Now, let us try to produce a signal $C_{qj}$ to satisfy formula (28) wherein the maximum value of the absolute value of $G_{ij}$ is $G_{MAX}$.

$$C_{qj}^2 = \sum_{i=1}^{L} \{G_{max}^2 - (G_{ij})^2\} \tag{28}$$

$$= LG_{max}^2 - \sum_{i=1}^{L} \{(G_{ij})^2\}$$

By using formulas (27) and (28), $$\sum_{k} \{(g'_{kj})^2\} + \sum_{k} \{C_{qj}^2\}$$

can be expressed as formula (29).

$$\sum_{k} \{(g'_{kj})^2\} + \sum_{k} \{C_{qj}^2\} = L \sum_{k} \{(G_{ij})^2\} + LC_{qj}^2 \tag{29}$$

$$= L \sum_{k} \{(G_{ij})^2\} + L \left[ LG_{MAX}^2 - \sum_{i=1}^{L} \{(G_{ij})^2\} \right]$$

$$= (LG_{MAX})^2$$

When formula (29) is considered to be equal to formula (25), formula (30) can be obtained.

$$G_{MAX}^2 = P/L^2 \tag{30}$$

With formulas (28) and (30), formula (31) is obtained.

$$C_{qj} = \left( (P/L) - \sum_{i=1}^{L} \{(G_{ij})^2\} \right)^{1/2} \tag{31}$$

The formula shows that the correction signals are applied to the j-th column electrodes in a non-selection state for a time of $L \cdot \Delta t_k$ at the q-th simultaneous selection. The squared and summed value of the correction signals to any simultaneous selection can be expressed by formula (32).

$$\sum_{k} \{C_{qj}^2\} = \sum_{k} \{P/L\} - \sum_{k} \left\{ \sum_{i} \{(G_{ij})^2\} \right\} \tag{32}$$

$$= P - L\Sigma\{(G_{ij})^2\}$$

Further, when the maximum value of $C_{qj}$ is $C_{MAX}$, $\Sigma\{(G_{ij})^2\}=0$ is established. Accordingly, formula (33) is obtainable.

$$C_{MAX} = P^{1/2} \tag{33}$$

When formula (32) is satisfied, a synthetic signal is expressed by formula (34) in a single simultaneous selection time, which satisfies the conditions to be constant.

$$\Sigma\{(g'_{kj})^2\} + \Sigma\{C_{qj}^2\} = L\Sigma\{(G_{ij})^2\} + L[(P/L) - \tag{34}$$

$$\Sigma\{(G_{ij})^2\}]$$

$$= P$$

Accordingly, all simultaneous selection numbers in a frame are also constant. The correction signals concerning the j-th column electrodes in a frame is expressed by formula (35).

$$\sum_{q} \left\{ \sum_{k} \{C_{qj}\} \right\} = \sum_{q} \left\{ \sum_{k} \{P/L\} - \sum_{i} \{(G_{ij})^2\} \right\} \tag{35}$$

$$= MP - L \sum_{i=1}^{F} \{(G_{ij})^2\}$$

Figure 12:
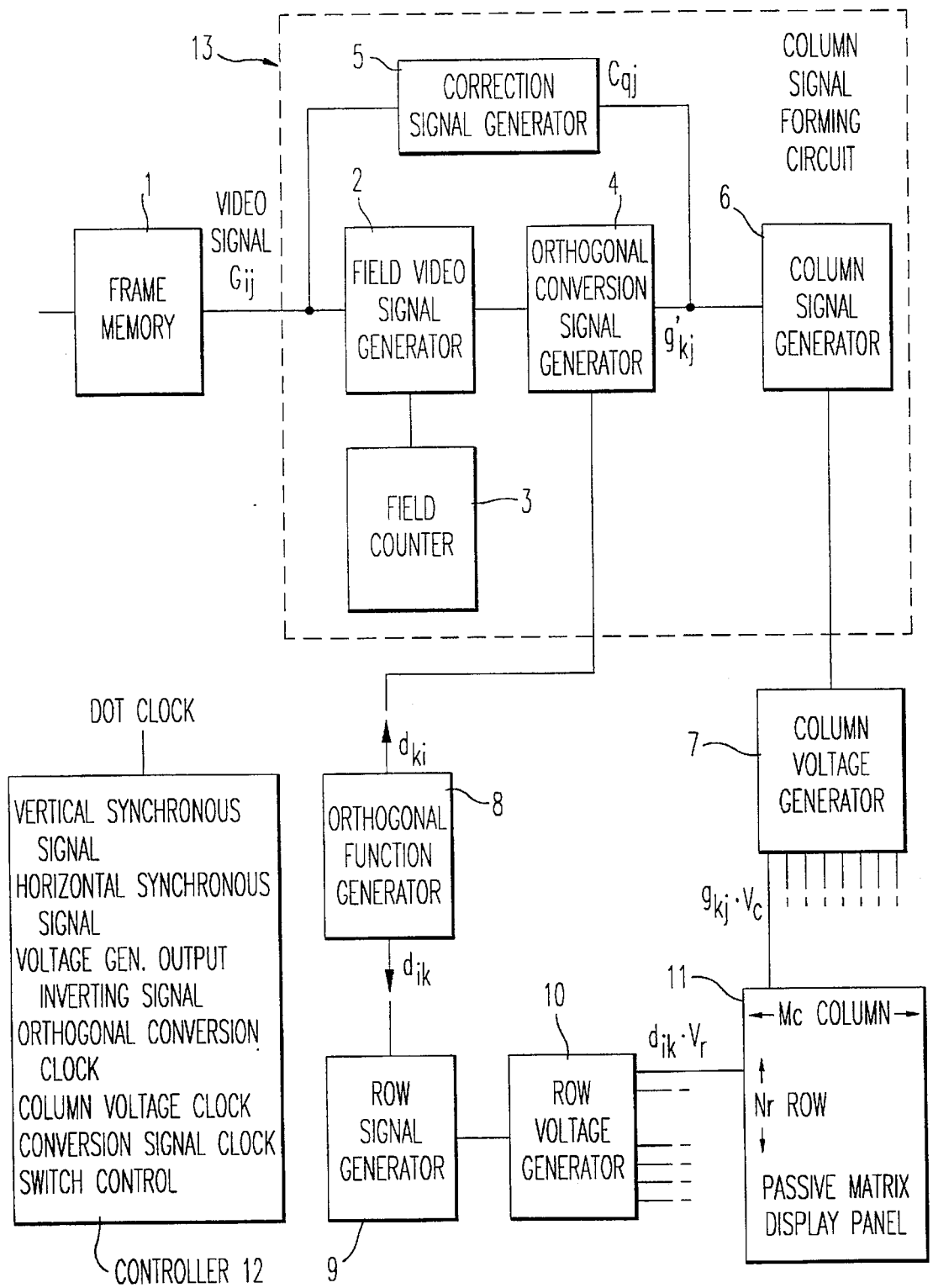
FIG. 12 is a block diagram showing the construction of another embodiment of the display apparatus of the present invention.

Various methods can be considered to add the correction signals. It is sufficient that the correction signals in formula (34) are applied in a one-frame time $F\Delta t_k$. Further, they may be applied in a one slot, or a plurality of slots, or to such an extent that deterioration of the quality of display is not conspicuous. For instance, a period of time for applying the correction signals may be provided between a simultaneously selection time and the next simultaneous selection time, or the correction signals may be applied all together after the finishing of the groups of simultaneous selection in a frame. In the former case, the application of the correction signals is done in an independent time separated from a time of applying the orthogonal conversion signals. In the later case, the correction signals are calculated for each group of simultaneous selection of the plurality of row electrodes, and the calculated values are combined with actual video signals as a group, which are supplied as imaginary video signals to an orthogonal conversion signal generator, so that column driving signals including the actual video signals and the correction signals are produced. Alternatively, the number of simultaneous selection S is reduced from the degree number L of the Walsh function by one, and the correction signals of one simultaneous selection may be applied as imaginary video signals to the orthogonal conversion signal generator and the field video signal converter. In this case, a display apparatus having the construction as shown in FIG. 12 is used.

From formula (27) and the function values shown in Table 1, formula (36) is established.

$$(g'_{kj})_{MAX} = LG_{MAX} \tag{36}$$

Accordingly, it is necessary that the column voltage generator generates a voltage whose dynamic range is in formula (37).

$$V_c \cdot (P)^{1/2} = V_c \cdot L\{G_{MAX}\} = V_c \cdot LC_{MAX} \tag{37}$$

Thus, a voltage of L times as much as $C_{MAX}$ can be produced. Accordingly, when the correction signals are applied separate from the orthogonal conversion signals, a time of applying the correction signals can be reduced to (1/L).

In a case of applying the voltage of formula (37), a time of applying the correction signals to a simultaneous selection time can be $\Delta t_k$. Further, in case of one frame, the time is $M\Delta t_k$.

In the present invention, during a selection time, an L number of signals developed on the time axis are applied to row electrodes as shown in formula (5). When a liquid crystal display element is driven, the L number of signals are dispersed in one frame and applied to row electrodes whereby a relaxation phenomenon of liquid crystal can be suppressed. The relaxation phenomenon of liquid crystal is seen in a liquid crystal display element having so large number of scanning lines or a liquid crystal display element using so fast responding liquid crystal having a response time of about 50–100 ms, that the response of liquid crystal is out of the response to effective value of an applied voltage, the reduction of contrast ratio is resulted. The reduction of the contrast ratio of a liquid crystal display element can be suppressed by dispersing the L number of signals in one frame and applying the signals. As a method of dispersion and application of the signals, a method described in U.S. Pat. No. 5,262,881 can be employed.

By using the method described above, gray shade displaying by the amplitude modulation can be conducted without non-uniformity of display. However, when the gray shade level is increased, hardware for effecting the amplitude modulation is extremely complicated.

In the above-mentioned description, it is understood that a gray shade display can be realized without causing non-uniformity of display even when the amplitude modulation of driving pulses is used. Since the gray shade display is determined by the effective value of a driving voltage, gray shade display is possible as far as formula (17) is satisfied even when the driving pulse width or the pulse number is modulated in a predetermined time. Further, a combination of the amplitude modulation and the pulse number (or the pulse width) may be used.

In the present invention, a gray shade in a displayed picture can be obtained by: (1) the amplitude modulation of column electrode driving signal pulses, and (2) a combination of a plural numbers of groups of amplitude-modulated column voltage driving signal pulse trains (frame modulation). This will be described below.

First, accuracy of a column voltage, i.e. a gray shade level number is considered. Since the scale factor between the video signal and the column driving signal is L as shown in formula (36), the level number of the column voltage generator is L times as much as the level number before the orthogonal conversion. Namely, when the bit width of the picture signals is $B_{si}$ and the bit width of the column voltages is $B_{am}$, formula (38) is established.

$$B_{am}=M_L+B_{si} \tag{38}$$

where $M_L$ is a minimum positive integer to provide $M_L \geq \text{Log}_2(L)$, and the gray shade level number of the column driving signals should be L times as the display level number.

In the following, a method of realizing a target gray shade level by combining the amplitude modulation of the column electrode driving signal pulses and some numbers of group of the amplitude-modulated column electrode driving signal pulses, will be described.

A frame is divided into an Nf number of field pictures on the time axis by utilizing the residual image characteristic of visual sensation. In the conventional technique, when a gray shade display was effected only by the amplitude modulation, it was necessary to locate a digital-analogue converter (DA converter) having accuracy corresponding to L times as the gray shade level in front of the column voltage generator. In the present invention, however, when a frame is divided into an Nf number of fields, the bit accuracy of the column voltage DA converter is expressed by $N=\text{Log}_2(Nf)$, and the bit accuracy can be coarse as $(B_{am}-N)=(B_{si}+M_L-N)$. Namely, the burden of the DA converter is reduced, and accordingly, the construction of the column signal generator and the column voltage generator can be made simple.

Figure 11:
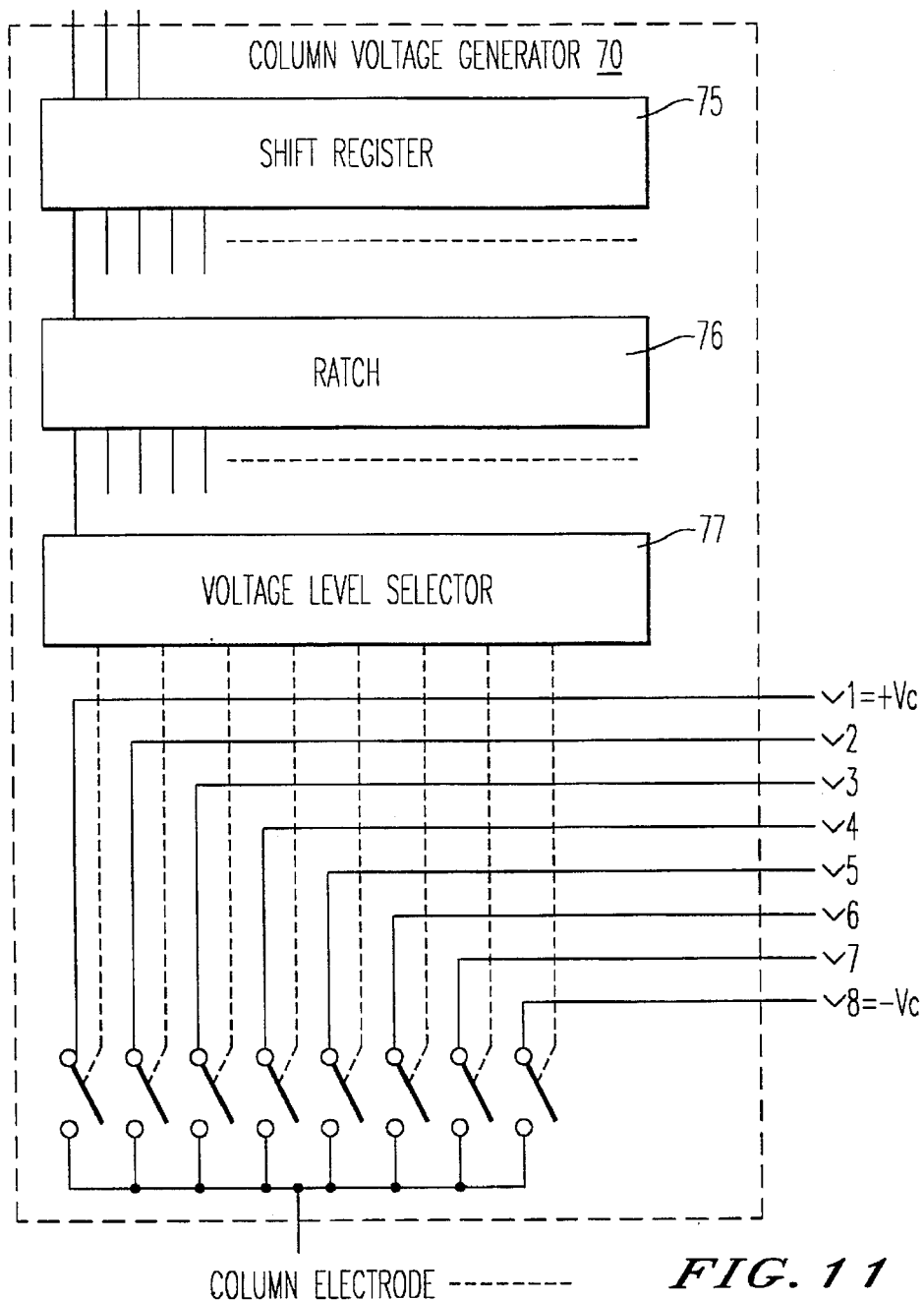
FIG. 11 is a block diagram showing the construction of another embodiment of the row voltage generator.

For instance, in a case of about $(B_{am}-N)=3$ bits, digital-analogue conversion can be easily realized by combining analogue switches and decoders wherein eight different levels of reference voltage as shown in FIG. 11 are used, and the digital analogue converter can be installed in the column voltage generator 7. Further, the bit number of signals treated by the conversion signal generator 4 and the correction signal generator 5 is also reduced so that the burden of the generators can be reduced.

Figure 3:
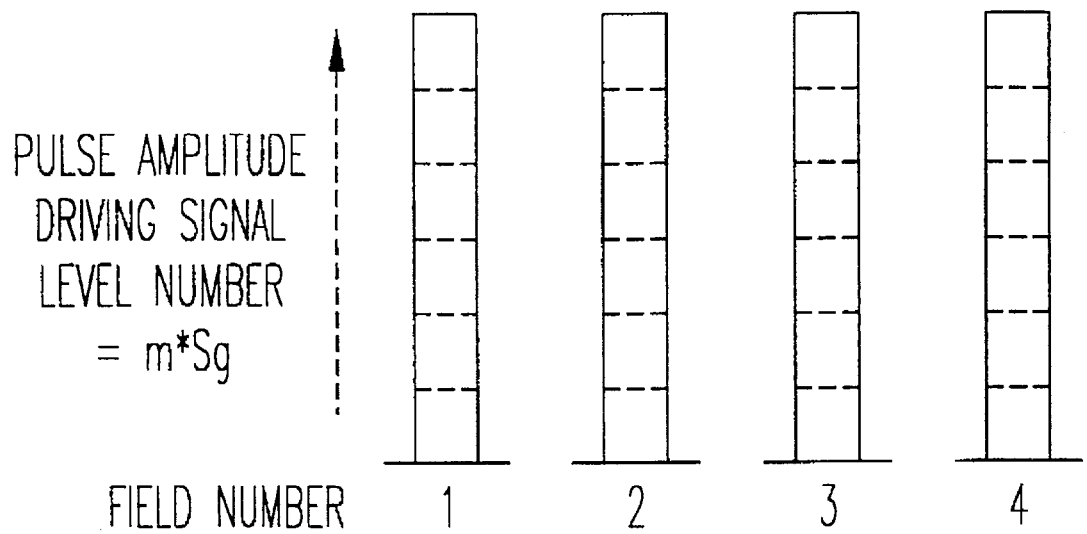
FIG. 3 is a diagram showing the distribution of amplitude-modulated pulses to a picture of fields of the present invention.

As shown in FIG. 3, when a target gray shade number is determined as Gt, and a frame is divided into an Nf number of fields as described above, the target level number per one field can be reduced as Sg=Gt/Nf. However, since the gray shade level number of the column driving signals is L times as the display level number, a level number of (L·Sg) is needed for the column voltage generator 7.

Considering how to distribute the gray shade level and the column electrode driving pulses, there are a plurality of ways to distribute driving pulses to each field in the same gray shade level, in particular, in a case of an intermediate gray shade level $\{2-(Gt-Nf)\}$.

If a value obtained by adding the pulse amplitude level of each field over the entire fields in a frame, each effective value has the same value. However, the response speed of the transmittance of a liquid crystal display apparatus varies depending on the initial state, and the crest value or the pulse width of applied pulses. Accordingly, the distribution of the driving pulses has to be decided while the quality of display such as the contrast ratio or a flicker is evaluated. On the contrary, in accordance with the method of the present invention, the optimum method of distributing driving pulses to obtain the best quality of display can be selected depending on a change of the response characteristic of a display panel.

Figure 1:
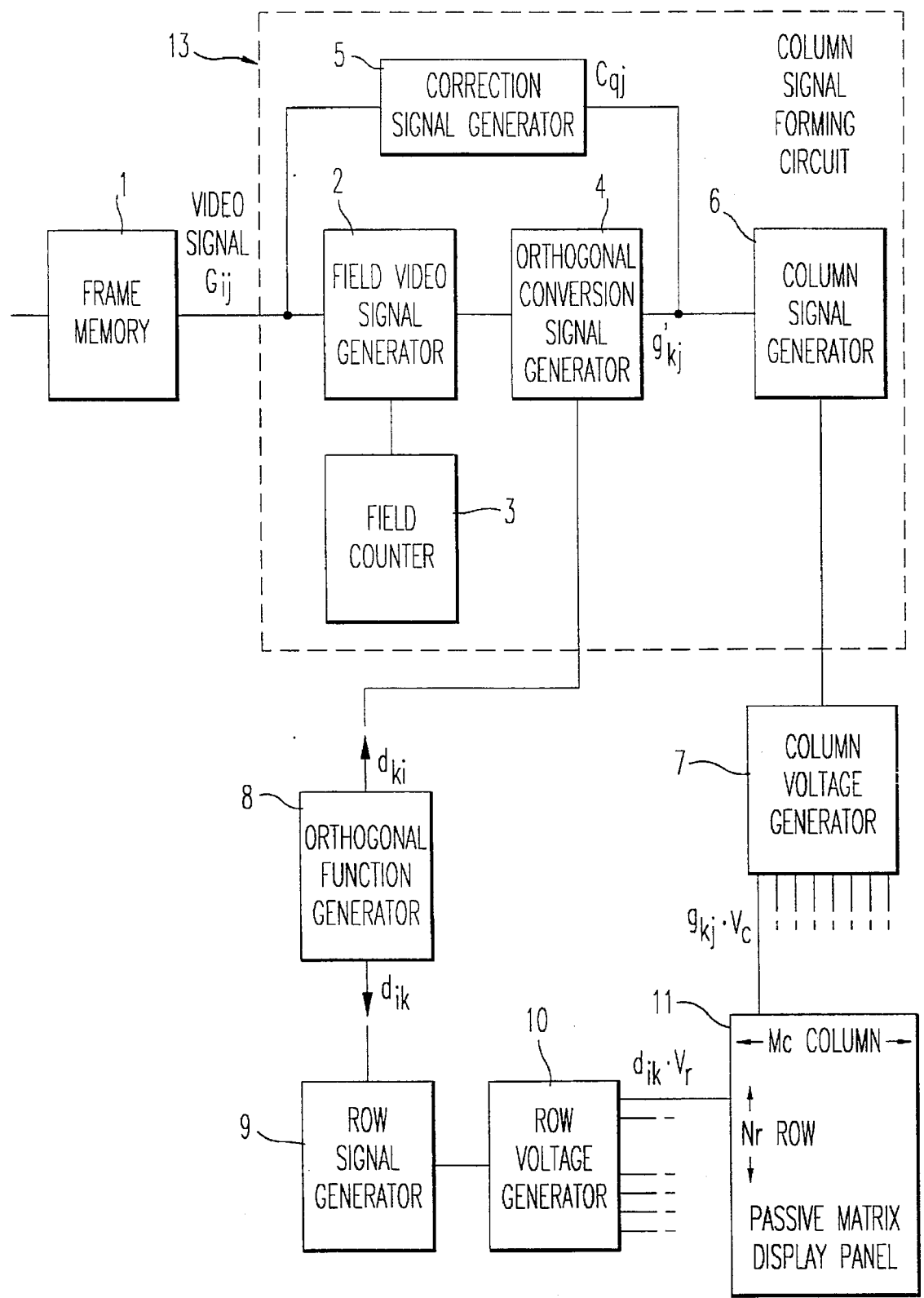
FIG. 1 is a block diagram showing the construction of an embodiment of a display apparatus according to the present invention.

FIG. 1 is a block diagram of an embodiment of the display apparatus according to the present invention. The difference in construction of the display apparatus shown in FIG. 1 from the display apparatus shown in FIG. 2 is that a field counter 3 and a field video signal converter 2 are added, and simultaneous selection of plural row electrodes and orthogonal function conversion are used so that the amplitude modulation of the column driving signals and the field modulation are combined to thereby obtain a gray shade display. The display apparatus in FIG. 1 is so constructed that the field video signal converter 2 is inserted between the orthogonal conversion signal generator 4 and the frame memory 1 to determine the distribution of the column electrode driving pulses to each field depending on the field number and the video signals, and the outputs from the field video signal converter 2 are supplied to the orthogonal conversion signal generator 4.

With use of the above-mentioned method, the display panel driving voltage peak value can be reduced in comparison with the conventional technique; the fluctuation of the effective value of column voltages due to amplitude-modulated driving signals can be compensated to reduce non-uniformity of display; and the distribution of the driving pulses suitable for the transient response characteristic of a display panel can reduce a flicker.

[EXAMPLE]

Figure 10:
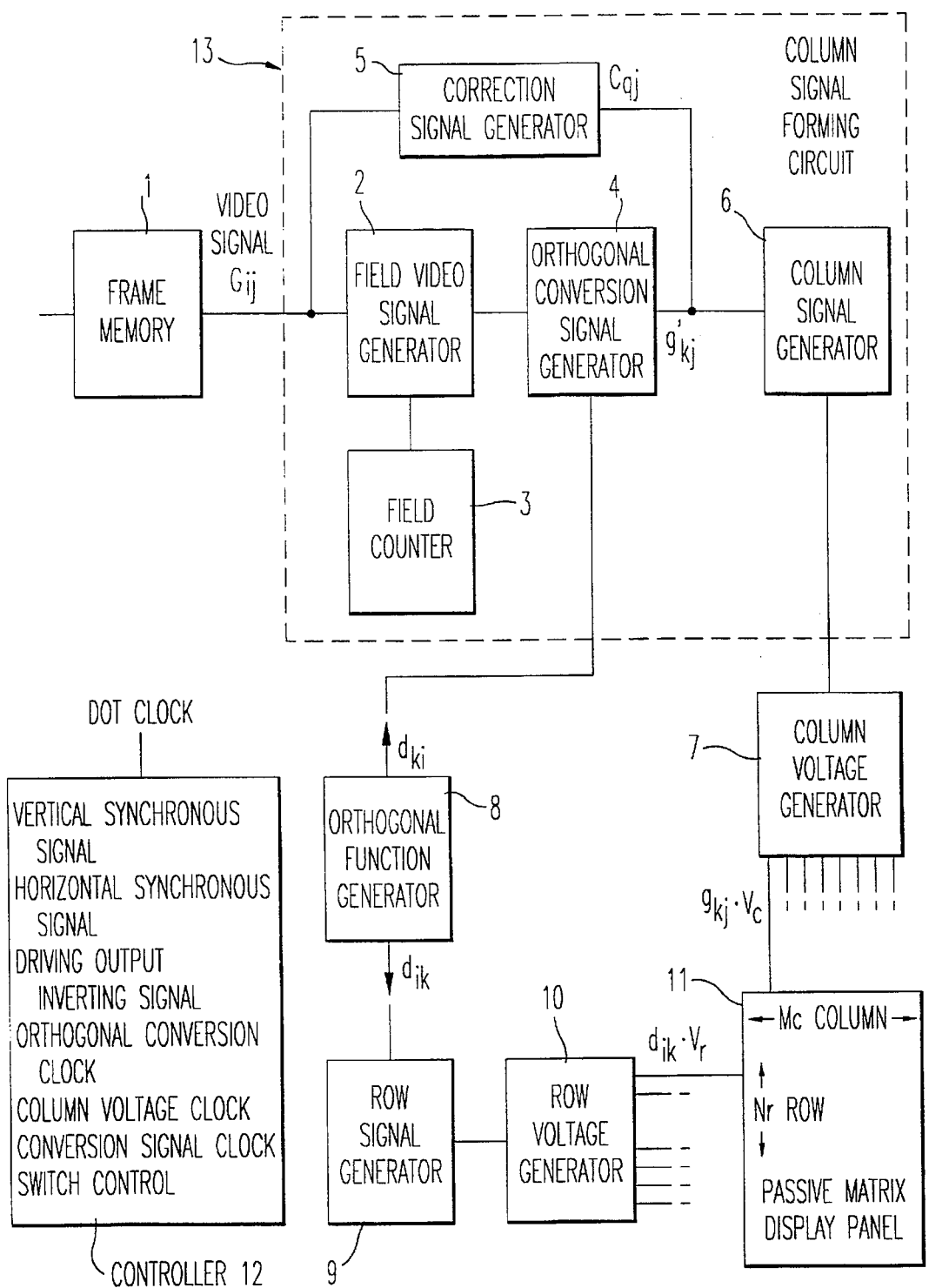
FIG. 10 is a block diagram showing the construction of another embodiment of the display apparatus according to the present invention.

A display apparatus shown in FIG. 10 was formed by preparing a liquid crystal display panel comprising 240 of row electrodes and 320×3=960 of column electrodes, and by determining the number of simultaneous selection of row electrodes being 8. Although the panel is constituted by 320 of pixels per row with respect to an image, 960 of column electrodes are necessary in order to divide light into primary colors of R, G and B in display.

The display apparatus in FIG. 10 comprises a frame memory 1, a field video signal converter 2, a field counter 3, an orthogonal conversion signal generator 4, a correction signal generator 5, a column signal generator 6, a column voltage generator 7, an orthogonal function generator 8, a row signal generator 9, a row voltage generator 10, a controller 12 and a display panel 11. Among these, the field video signal converter 2, the field counter 3, the orthogonal conversion signal generator 4, the correction signal generator 5 and the column signal generator 6 constitute a column signal forming circuit 13. The controller 12 controls the timing of the operation of the above-mentioned elements.

Figure 7:
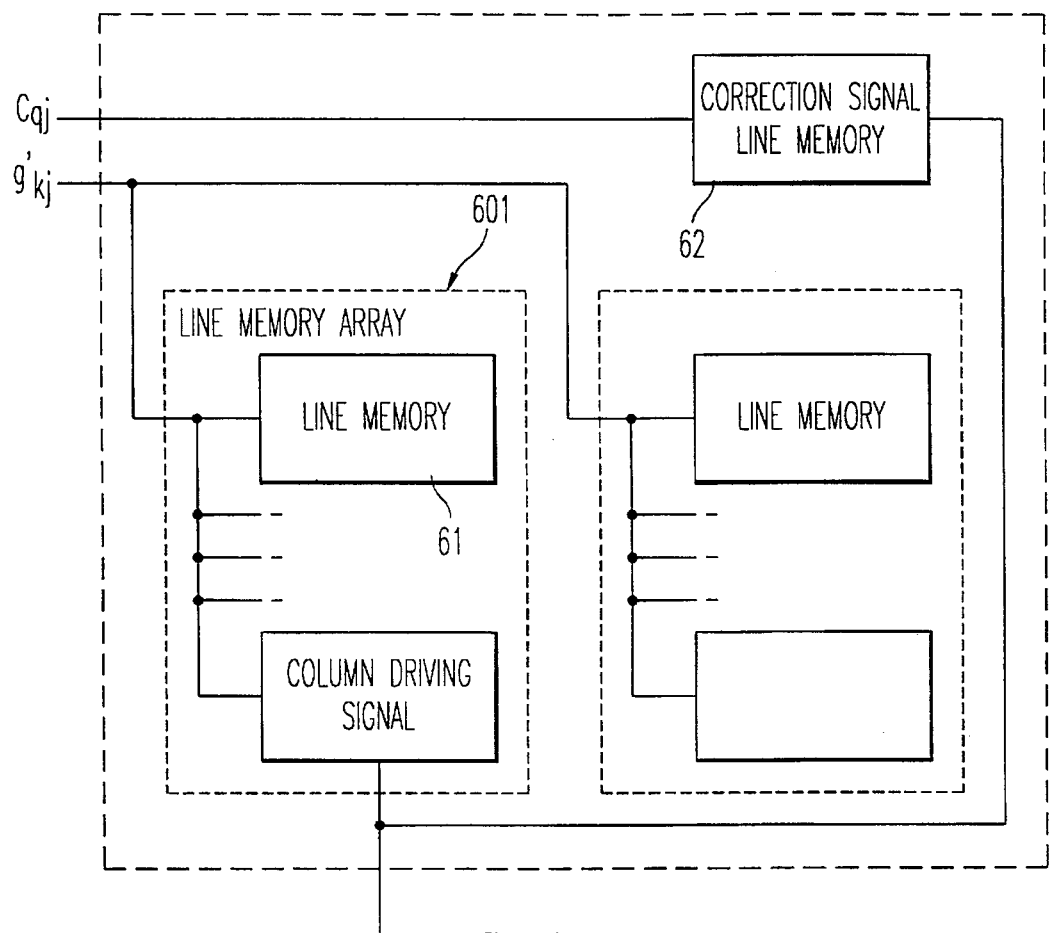
FIG. 7 is a block diagram showing the construction of an embodiment of a column signal generator 6.
Figure 13:
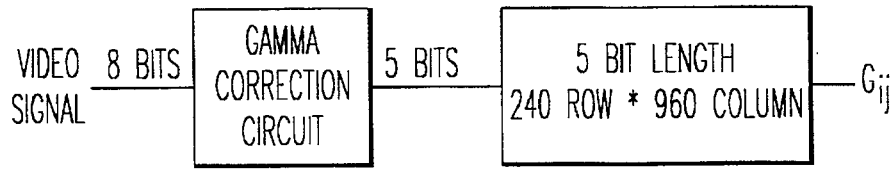
FIG. 13 is a block diagram showing the construction of an embodiment of a frame memory 1.

The frame memory 1 has a construction of 240 rows×960 columns×5 bits. The frame memory 1 stores each signal of R, G and B in the order of R, G and B in correspondence to each horizontal line, each of the signals being subjected to analogue-digital conversion and gamma correction. The output is 5 bits×8 ports so as to correspond to the number of simultaneously selected rows. In this example, the data length of a brightness signal (a gray shade signal) for each pixel is 5 bits, and accordingly, the memory 1 is formed of a 5 bit length. However, when a input signal has a 8 bit length, a construction as shown in FIG. 7 wherein a 8/5 bit conversion system is included in a gamma correction circuit as shown in FIG. 13, may be used.

The average response time of the display panel 11 used was 50 ms and the threshold voltage was 2.5 Vrms. The peak value $V_r$ of a row electrode driving voltage used was ±10.0 V and the peak value $V_c$ of a column electrode driving voltage was ±5.47 V. The column electrodes are arranged in the order of R, G and B as primary colors, each comprising 320 and 960 in total.

Each group comprising 8 number of row electrodes is simultaneously selected from the upper portion of the display panel, and the column electrode driving signals ($g'_{kj}$ = $\Sigma d_{ki}G'_{ij}$) are calculated through the field video signal converter 2 from a memory region of corresponding horizontal lines successively, wherein $G'_{ij}$ is field signals obtained by passing the video signals from the memory to the field video signal converter 2.

Figure 4:
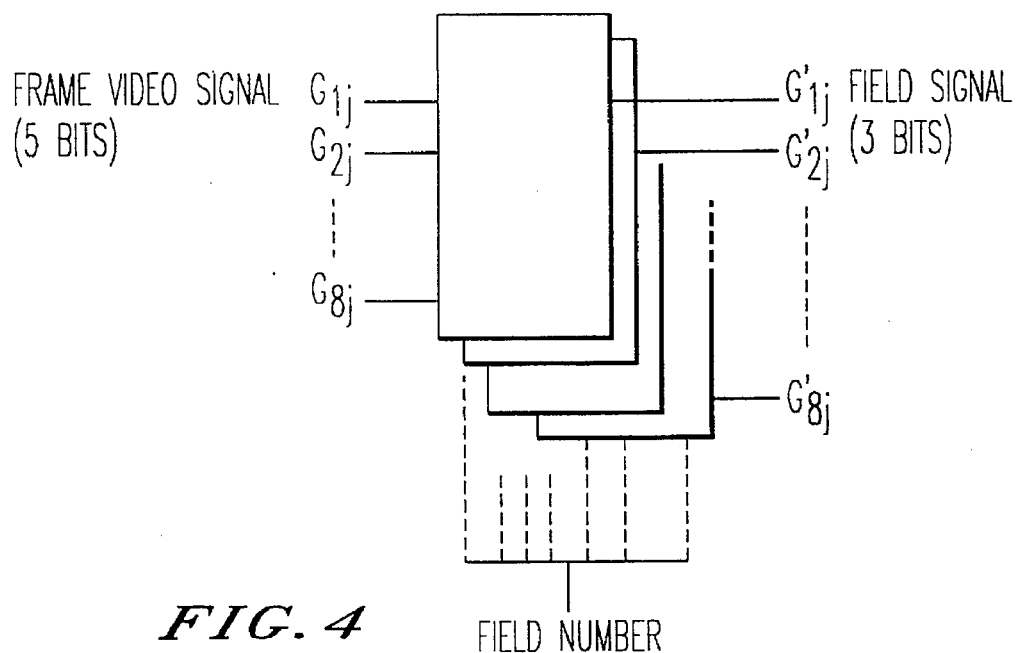
FIG. 4 is a diagram showing the construction of an embodiment of a field video signal converter 2.
Figure 5:
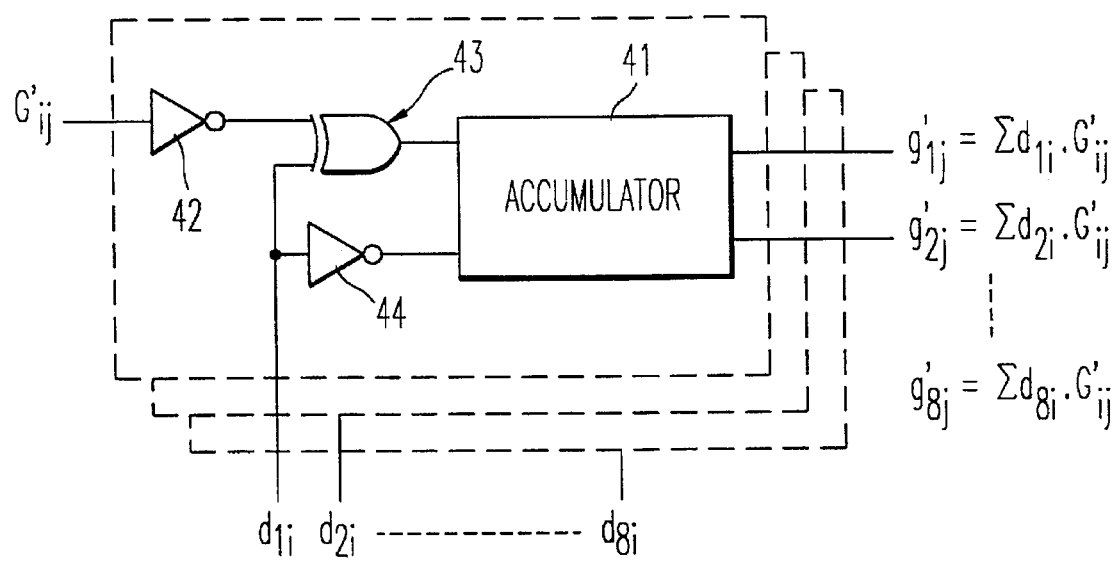
FIG. 5 is a diagram showing the construction of an embodiment of an orthogonal conversion signal generator 4.

The field video signal converter 2 has the function as shown in FIG. 4 wherein 5 bit frame picture signals $G_{ij}$ are converted into field signals $G'_{ij}$ in a relation shown in Table 2 according to field numbers inputted from the field counter. In correspondence to the number of simultaneously selected rows, $G_{ij}$ signals of 8 ports are received and the conversion of 8 rows is conducted in parallel. The field counter 3 is a 2 bit upcounter to supply field numbers to the field picture signal converter 2.

Table 2 shows a case that 5 bit video signals are developed to 3 bit×4 field signals wherein the arrangement of signals of an intermediate gray shade level are experimentally determined so that a flicker can be minimized and the contrast ratio becomes large. Numerals in Table 2 show amplitude level numbers of column driving signals.

TABLE 2

Input gray shade level and pulse arrangement (the pulse amplitude of each field)
Input gray shade level = Gt, Gt = ΣSf, Sf = Gray shade number of each field, Pulse amplitude (Driving signal level) = L × Sf, f = Field number, L = 8

| Input gray shade level Gt | Field number f | | | |
|---|---|---|---|---|
| | 1 | 2 | 3 | 4 |
| 32 | 64 | 64 | 64 | 64 |
| 31 | 64 | 64 | 64 | 48 |
| 30 | 64 | 64 | 64 | 32 |
| 29 | 64 | 64 | 64 | 16 |
| 28 | 64 | 64 | 56 | 8 |
| 27 | 64 | 64 | 56 | 0 |
| 26 | 64 | 64 | 48 | 0 |
| 25 | 64 | 64 | 40 | 0 |
| 24 | 64 | 56 | 40 | 0 |
| 23 | 64 | 56 | 32 | 0 |
| 22 | 64 | 56 | 24 | 0 |
| 21 | 64 | 56 | 20 | 0 |
| 20 | 64 | 56 | 16 | 0 |
| 19 | 60 | 56 | 16 | 0 |
| 18 | 56 | 56 | 16 | 0 |
| 17 | 56 | 52 | 16 | 0 |
| 16 | 56 | 48 | 16 | 0 |
| 15 | 52 | 48 | 16 | 0 |
| 14 | 48 | 48 | 16 | 0 |
| 13 | 48 | 46 | 16 | 0 |
| 12 | 48 | 44 | 16 | 0 |
| 11 | 48 | 42 | 16 | 0 |
| 10 | 48 | 40 | 16 | 0 |
| 9 | 48 | 36 | 16 | 0 |
| 8 | 48 | 32 | 16 | 0 |
| 7 | 48 | 24 | 16 | 0 |
| 6 | 48 | 16 | 16 | 0 |
| 5 | 40 | 16 | 16 | 0 |
| 4 | 32 | 16 | 16 | 0 |
| 3 | 16 | 16 | 16 | 0 |
| 2 | 16 | 16 | 0 | 0 |
| 1 | 8 | 8 | 0 | 0 |

The field signals having the same column number in the simultaneously selected rows are successively inputted to the orthogonal converter 4. The orthogonal converter 4 is so adapted to form complement for the field video signals $G'_{ij}$ through an inverter 42, the signals being inputted to an exclusive OR gate 43. The exclusive OR gate 43 also receives signals $d_{ki}$ from the orthogonal function generator 8 and outputs (+$d_{ki}$) or (−$d_{ki}$) in accordance with function values shown in Table 1. The calculation of ($d_{ki} \cdot G_{ij}$) is done in the inverter 42 and the exclusive OR gate 43. The outputs from the exclusive OR gate 43 are accumulated with respect to the simultaneously selected row numbers (i=1 through L). An inverter 44 is so adapted to send carriage control signals to an adder 41 when the value of the orthogonal function is (−1). There are 8 elements consisting of the accumulator 41 through the inverter 44, which corresponds to the time slot number in a simultaneous selection time. The adding operations are treated in parallel for each time slot number k. "Time slot" is referred to as the minimum pulse width of the orthogonal function used as driving signals for the row electrodes, and expressed as $\Delta t_k$.

The outputs $g'_{kj}$ from the accumulator 41 are stored in line memories 61 corresponding to the time slot number k in the next column signal generator 6 as shown in FIG. 7. The column signal generator 6 comprises two sets of line memory arrays 601 and a correction signal line memory 62. Each of the line memory arrays 601 comprises 8 line memories. As described before, the orthogonal conversion signals of the pixels (i, j) (:i=1 through 8, j=1 through 960) are accumulated and added in parallel in eight accumulators, and operations of orthogonal conversion and adding are executed for the simultaneously selected rows. The accumulated and added signals are stored in the line memories, and then, the operation of conversion of the video signals for the next columns is started. The operation of conversion is conducted for all simultaneously selected columns in the same manner as above, and when signals for one field are stored in the eight line memories, signals are supplied from line memories having earlier orthogonal conversion number to the column voltage generator 7. The orthogonal conversion number k is 1 through 8.

The orthogonal function generator 8 produces function values shown in Table 1, which are supplied as signals of $(d_{ki})$ or $(d_{ik})$ to the orthogonal conversion signal generator 4 and the row signal generator 9. The signals inputted to the orthogonal conversion signal generator 4 from the orthogonal function generator 8 are supplied at a number of k in parallel in the order of the row number i. The timing of inputting the signals corresponds to the timing of operating the video signals. The row signal generator 9 receives the function values from the orthogonal function generator 8 to thereby form signals of a row driving pattern and a simultaneous selection pattern for each time slot, the signals being supplied to the row voltage generator 10.

Figure 9:
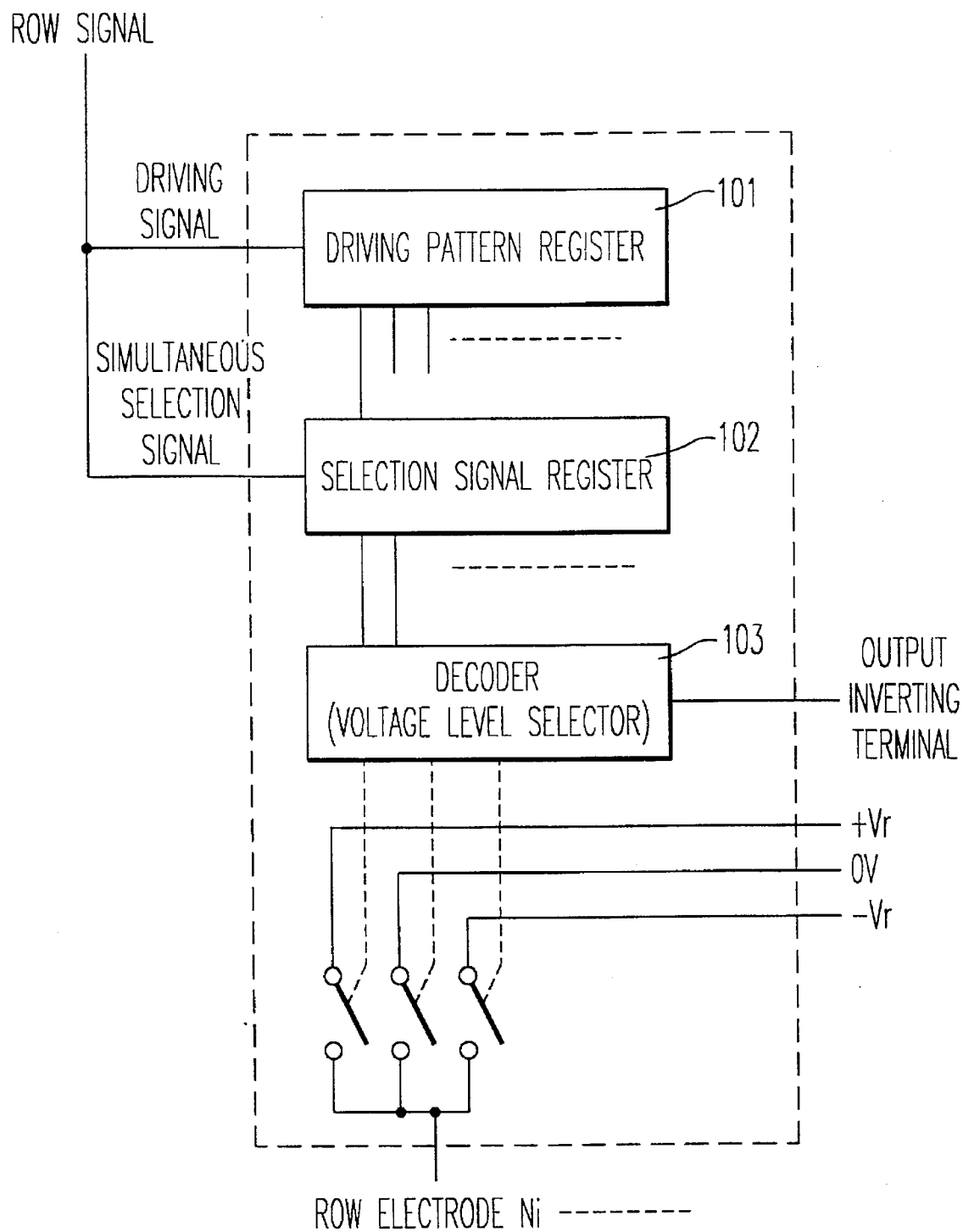
FIG. 9 is a block diagram showing the construction of an embodiment of row voltage generator 10.

The row voltage generator 10 has a construction as shown in FIG. 9 wherein it comprises a driving pattern register 101, a selection signal register 102 and a decoder (voltage level selector) 103. Simultaneous selection rows are determined depending on information in the selection signal register 102. Further, information in the driving pattern register 101 determines whether each of the rows outputs (+$V_r$) or (−$V_r$). A non-selection row outputs 0 V.

Figure 8:
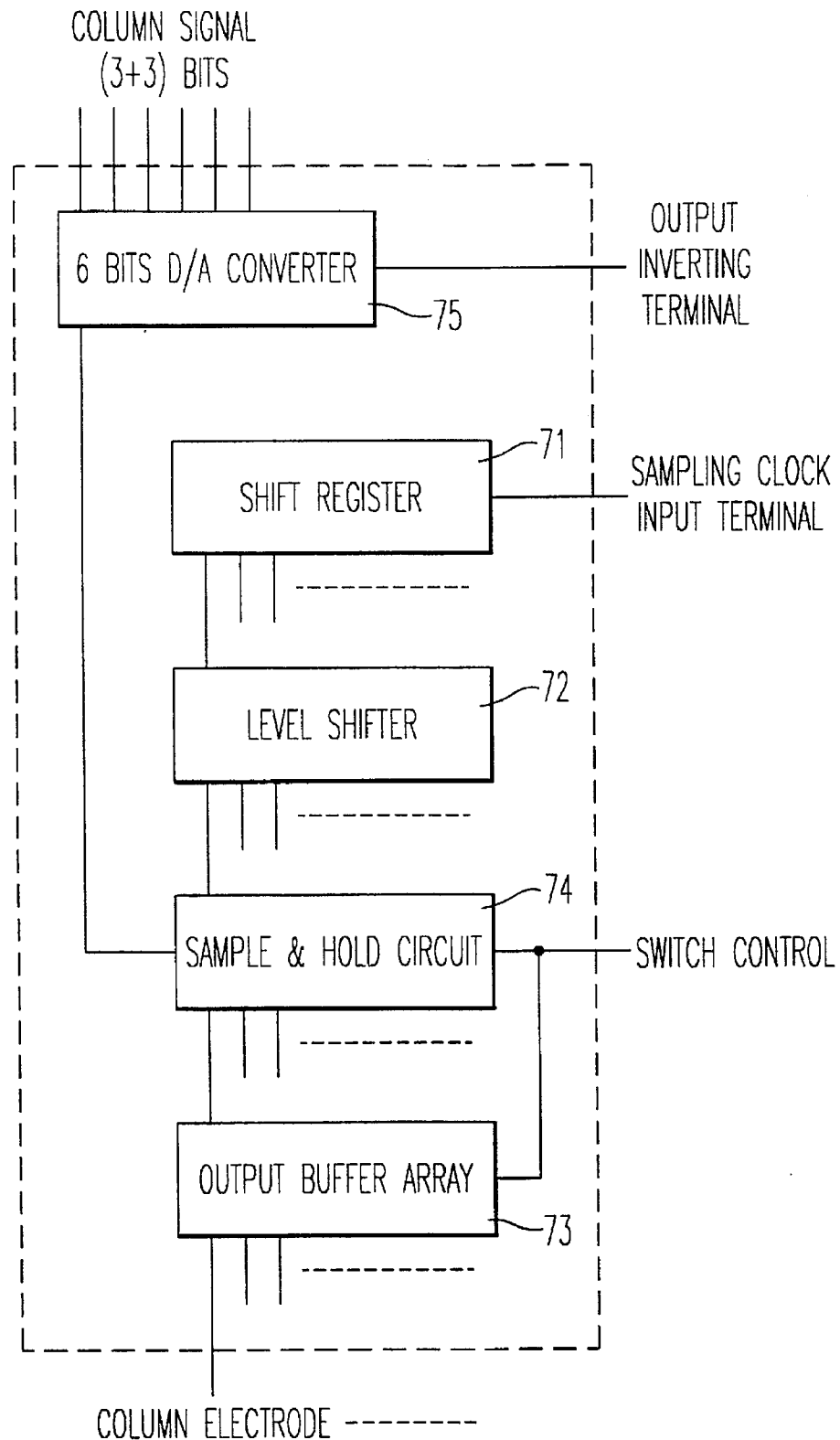
FIG. 8 is a block diagram showing the construction of an embodiment of a column voltage generator 7.

As shown in FIG. 8, the column voltage generator 7 comprises a shift register 71, a level shifter 72, a sample and hold circuit 74 and a buffer amplifier array 73. The column voltage generator 7 also conducts the conversion of the column voltage and the conversion of the orthogonal function corresponding to the orthogonal conversion number to the row voltage simultaneously when data for one row are supplied to the shift register 71. The sign of the driving voltage for a group of field data is inversed and the same signals are used for driving again. Namely, the inverted output terminals of the column voltage generator 7 and the row voltage generator 10 are kept active while the signals for the previous field are repeated, whereby the driving waveform having the opposite sign to that of the previous field can be obtained. The reason why such driving sequence is used is because a direct current potential should not be left on the liquid crystal panel. While one field is displayed, a display for the next field is prepared. For this purpose, an additional set of eight line memories are prepared as shown in FIG. 7 so that the operations and the storing of data are conducted in the same manner as above for the next field number.

After the conversion of signals for the first to the fourth field has been successively done by two sets of line memories, correction signals $C_{gj}$ are added prior to starting the operation for the next simultaneous selection group. The correction signals are supplied from the correction signal line memory 62 to the shift register 71 of the column voltage generator 7. Then, the conversion and the application of the column voltage are executed under the condition that all row electrodes are brought to a non-selection state. The correction signals are also subjected to the inversion of sign.

Figure 6:
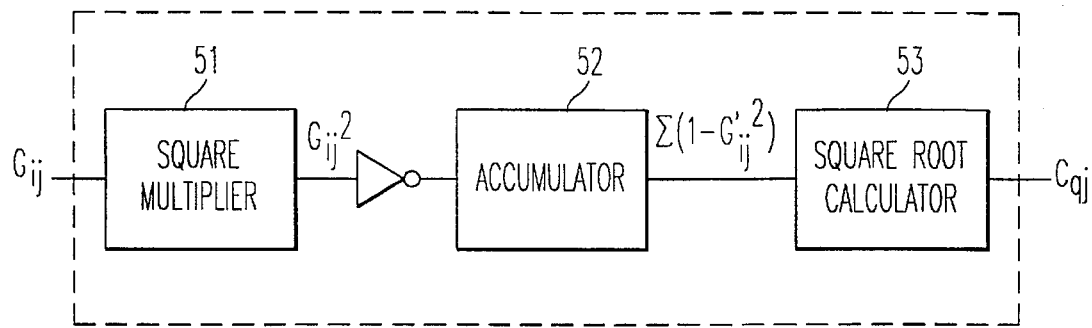
FIG. 6 is a block diagram showing the construction of an embodiment of a correction signal generator 5.

The correction signals are produced by means of a device shown in FIG. 6. Namely, formula (39) is obtained by rewriting formula (31).

$$C_{gj} = [LG^2_{MAX} - \Sigma\{(G_{ij})^2\}]^{1/2} \quad (39)$$
$$= G_{MAX}[\Sigma\{1-(G^2_{ij}/G^2_{MAX})\}]^{1/2}$$

The operation of formula (39) is conducted as follows. The square value of video signals on the j column of the simultaneously selected row electrodes is calculated by a square multiplier 51. The complement of the calculated values are added by an accumulator 52 for the signals of the number of i=1 through L of the simultaneously selected row electrodes. Then, the added value is stored in the correction signal line memory 62 via a square root calculator 53 and the column signal generator 6. In this case, the maximum amplitude (level number), i.e. the bit width of the correction signal may be matched with the bit width of the orthogonal conversion signal.

The correction signal was supplied to the column voltage generator 7 at a timing just after the simultaneous selection time. The correction signal was supplied in a time of $8\Delta t_k$ for 8 fields inclusive of a time of the inversion of the sign. A non-selection voltage was applied to the row electrodes in a time of applying the correction signal. The frame frequency providing an excellent display was 30–46 Hz. A time F needed for one frame is:

$$F=2(4LM+4M)\Delta t_k=8(L+1)M\Delta t_k=21-32 \text{ ms}$$

(L=8, M=30, $\Delta t_k$=10–15 µs)

The execution of the operation of the signals was difficult in a high frame frequency region. In a low frequency region, a flicker became conspicuous.

In the above-mentioned description, each field is continuously displayed for each group of simultaneous selection. However, it is possible to use a method that simultaneous selection scanning is completed for a field, and then, the next field is displayed. In this case, the construction shown in FIG. 11 can be used provided only a sequence signal is changed. Either the former method or the later method can be selected depending on the response characteristic of a display panel.

The same structural elements and the display panel as described above-mentioned examples were used in the construction shown in FIG. 12 wherein the number of simultaneous selection was 7 and the degree number of the Walsh function was 8, and correction signals for a single simultaneous selection were added as imaginary video signals to the orthogonal conversion signal generator. The same quality of display as the example was obtained.

In the construction shown in FIG. 10, the column electrodes are divided into six groups each comprising 160 column electrodes, and a signal treatment was conducted in parallel so that a signal treating system from the from memories to the column electrode generator corresponds to the column electrode group. As a result, a range of the frame frequency could be broadened.

In accordance with the present invention, a low voltage driving of a display panel becomes possible; driving signals for a gray shade display can be generated with a simple construction, and a high frequency component in the driving signal and a low frequency component can be reduced, whereby a display apparatus of a excellent quality and a low manufacturing cost and free from non-uniformity of display and a flicker can be provided.

We claim:

1. A display apparatus in which light transmittance of a pixel selected by a scanning electrode and a data electrode is changed in response to a difference of voltages applied to the scanning electrode and the data electrode, said display apparatus comprising:

an input for receiving an input data signal, said input data signal taking on one of a first predetermined number of first gray shade levels;

an orthogonal function generator for generating an orthogonal function signal having substantial orthogonality;

a data signal forming circuit for operating the input data signal based on the orthogonal function signal generated from the orthogonal function generator, wherein the data signal forming circuit includes:

a field video signal converter for distributing signals for a single picture to a plurality of time-sequential sub-pictures, each sub-picture being displayed in one field on a time axis, and the field video signal converter further converting the input data signal corresponding to one of the first predetermined number of first gray shade levels into an output data signal corresponding to one of a second predetermined number of second gray shade levels for each field, wherein each second gray shade level is displayed by pulses whose heights change in response to the second gray shade level and the second predetermined number of second gray shade levels is less than the first predetermined number of first gray shade levels, and an orthogonal conversion signal generator for effecting orthogonal conversion of the output data signal by the orthogonal function signal generated from the orthogonal function generator, the field video signal converter and the orthogonal conversion signal generator being connected in series; and a correction signal generator for generating a correction signal to be included in the output data signal so that an effective voltage applied to a pixel in a non-selection time is substantially constant to any pixel, an effective voltage to a pixel in a selection time in each of the fields corresponding to one of said second gray shade levels.

2. The display apparatus according to claim 1, wherein an output from the correction signal generator is superposed on outputs from the field video signal converter.

3. The display apparatus according to claim 1, wherein an output from the correction signal generator is superposed on inputs to the field video signal converter.

4. The display apparatus according to claim 1, wherein the data signal forming circuit further includes a field counter for supplying a sub-picture number to the field video signal converter.

5. The display apparatus according to claim 1, wherein the display apparatus is a liquid crystal display apparatus.

6. A method of driving a display apparatus having a plurality of scanning electrodes and a plurality of data electrodes, wherein the light transmittance of a pixel selected by a scanning electrode and a data electrode is changed in response to a difference of voltages applied to the scanning electrode and the data electrode, said method comprising the steps of:

receiving an input data signal for a single picture taking on one of a first predetermined number of first gray shade levels;

distributing the input data signal for the single picture and corresponding to one of the first gray shade levels to a plurality of time-sequential sub-pictures, each sub-picture being displayed in one field, and converting the input data signal into an output data signal corresponding to one of a second predetermined number of second gray shade levels, wherein each second gray shade level is displayed by pulses whose heights change in response to the second gray shade level and the second predetermined number of second gray shade levels is less than the first predetermined number of first gray shade levels;

orthogonally converting the output data signal; and generating a correction signal to be added to the output data signal so that an effective voltage applied to a pixel in a non-selection time is substantially constant to any pixel, an effective voltage to a pixel in a selection time in each of the fields corresponding to one of said second gray shade levels.

7. The method according to claim 6, wherein the correction signal is generated and added to the output signal prior to orthogonally converting the output data signal.

8. The method according to claim 6, wherein the correction signal is generated subsequent to orthogonally converting the output data signal and correction signal is added to the orthogonally converted output signal.

* * * * *